United States Patent
Ha et al.

(10) Patent No.: US 9,761,044 B2
(45) Date of Patent: Sep. 12, 2017

(54) APPARATUS AND METHOD FOR GENERATION OF A LIGHT TRANSPORT MAP WITH TRANSPARENCY INFORMATION

(71) Applicant: Samsung Electronics Co., Ltd., Suwon-si (KR)

(72) Inventors: In Woo Ha, Yongin-si (KR); Min Su Ahn, Seoul (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 14/605,072

(22) Filed: Jan. 26, 2015

(65) Prior Publication Data

US 2015/0269772 A1    Sep. 24, 2015

(30) Foreign Application Priority Data

Mar. 18, 2014    (KR) .................. 10-2014-0031636

(51) Int. Cl.
*G06T 15/50* (2011.01)
*G06T 15/55* (2011.01)
*G06T 15/80* (2011.01)

(52) U.S. Cl.
CPC .............. *G06T 15/55* (2013.01); *G06T 15/80* (2013.01); *G06T 2215/12* (2013.01)

(58) Field of Classification Search
None
See application file for complete search history.

(56) References Cited

U.S. PATENT DOCUMENTS

| | | | |
|---|---|---|---|
| 7,091,973 B1 * | 8/2006 | Cohen | G06T 15/50 345/426 |
| 8,493,383 B1 * | 7/2013 | Cook | G06T 15/06 345/419 |
| 8,538,183 B1 * | 9/2013 | d'Eon et al. | G01N 21/4738 345/615 |
| 2001/0012018 A1 * | 8/2001 | Hayhurst | G06T 15/503 345/630 |
| 2002/0107070 A1 | 8/2002 | Nagy | |
| 2003/0034968 A1 * | 2/2003 | Abramov | G06T 1/20 345/418 |
| 2004/0001062 A1 * | 1/2004 | Pharr | G06T 15/55 345/426 |
| 2004/0263511 A1 * | 12/2004 | West | G06T 15/40 345/421 |
| 2008/0186306 A1 | 8/2008 | Darphin et al. | |
| 2009/0096803 A1 * | 4/2009 | Tartaglia | G06T 15/80 345/589 |

(Continued)

FOREIGN PATENT DOCUMENTS

| JP | 2005-222358 A | 8/2005 |
|---|---|---|
| JP | 2006-195940 A | 7/2006 |

(Continued)

*Primary Examiner* — Anh-Tuan V Nguyen
(74) *Attorney, Agent, or Firm* — NSIP Law

(57) ABSTRACT

A generator of an image processing apparatus may generate a light transport map (LTM) by sampling depth information from a light to an object based on a transparency of the object, wherein the LTM may be used to compute a visibility of the light with respect to a first point to be rendered.

29 Claims, 12 Drawing Sheets

(56) References Cited

U.S. PATENT DOCUMENTS

| | | | |
|---|---|---|---|
| 2010/0188416 A1* | 7/2010 | Hayes | G06T 15/503 345/592 |
| 2010/0254596 A1* | 10/2010 | Xiong | G06T 3/4053 382/159 |
| 2011/0012901 A1* | 1/2011 | Kaplanyan | G06T 15/506 345/426 |
| 2011/0199385 A1* | 8/2011 | Enderton | G06T 15/503 345/589 |
| 2012/0013603 A1* | 1/2012 | Liu | G06T 5/003 345/419 |
| 2012/0113117 A1* | 5/2012 | Nakayama | G06T 7/0051 345/420 |
| 2012/0219236 A1* | 8/2012 | Ali | G06T 5/002 382/276 |
| 2012/0229806 A1* | 9/2012 | Gautron | G06T 15/55 356/337 |
| 2012/0299922 A1 | 11/2012 | Ha et al. | |
| 2012/0320039 A1 | 12/2012 | Ha et al. | |
| 2013/0127895 A1* | 5/2013 | Miller | G06T 15/503 345/589 |
| 2013/0314431 A1* | 11/2013 | Salvi | G09G 5/02 345/589 |
| 2014/0092221 A1* | 4/2014 | Nagai | H04N 13/0022 348/51 |
| 2014/0146045 A1* | 5/2014 | McGuire | G06T 15/405 345/422 |
| 2014/0313198 A1* | 10/2014 | Keller | G06T 15/506 345/426 |
| 2014/0354632 A1* | 12/2014 | Alj | G06T 7/0065 345/419 |
| 2015/0302592 A1* | 10/2015 | Bruls | G06T 7/0051 348/44 |
| 2015/0371433 A1* | 12/2015 | Lecocq | G06T 15/60 345/422 |
| 2016/0005213 A1* | 1/2016 | Lecocq | G06T 15/60 345/419 |

FOREIGN PATENT DOCUMENTS

| | | |
|---|---|---|
| JP | 2008-77408 A | 4/2008 |
| KR | 10-2011-0070344 A | 6/2011 |

* cited by examiner

APPARATUS AND METHOD FOR GENERATION OF A LIGHT TRANSPORT MAP WITH TRANSPARENCY INFORMATION

CROSS-REFERENCE TO RELATED APPLICATIONS

This application claims the priority benefit of Korean Patent Application No. 10-2014-0031636, filed on Mar. 18, 2014, in the Korean Intellectual Property Office, the disclosure of which is incorporated herein by reference.

BACKGROUND

1. Field

Example embodiments of the following description relate to global illumination-based rendering with respect to a three-dimensional (3D) model, and more particularly, to a method of sampling an indirect illumination and rendering a 3D model based on a result of the sampling, for example, a radiosity method.

2. Description of the Related Art

Recently, an interest in real-time rendering with respect to a three-dimensional (3D) model has been growing in various fields, such as, 3D games, virtual reality animations, films, and the like. Such 3D rendering methods may include a radiosity method based on a global illumination. The radiosity method may be used to enhance a rendering quality by evaluating a direct illumination by a direct light source and an indirect illumination, for example, by a reflective light obtained through the direct light being reflected off of an object or a random reflection. In the radiosity method, a virtual point light (VPL) sampling may be performed by VPLs representing indirect illumination effects being disposed at predetermined positions in a 3D model, and a shading may be performed using the sampled VPLs.

SUMMARY

The foregoing and/or other aspects are achieved by providing an image processing apparatus, including a generator configured to generate a light transport map (LTM) corresponding to a light, wherein the LTM includes depth information of a three-dimensional (3D) space from a position of the light, and the depth information is sampled based on a transparency of an object included in the 3D space, and a shader configured to compute a visibility of the light with respect to a first point using the LTM. The sampling may include a probability sampling based on the transparency of the object. The sampling may include a sampling in a lower probability as the transparency of the object increases. The generator may be configured to generate a first random number corresponding to a first position on the LTM, and determine, to be first depth information corresponding to the first position, a distance between the light and a first object having a transparency lower than the first random number from among one or more objects overlapping in a direction of the first position.

The LTM may further include color information and transparency information corresponding to the depth information. First color information corresponding to the first position in the color information may include color information of one or more objects overlapping in the direction from the light to the first position and of which a distance from the light is less than a first depth value when a depth value corresponding to the first position on the LTM is the first depth value. First transparency information corresponding to the first position in the transparency information may be a value obtained by multiplying transparency values of the one or more objects overlapping in the direction from the light to the first position and of which the distance from the light is less than the first depth when the depth value corresponding to the first position on the LTM is the first depth value. The shader may be configured to compute the visibility of the light by comparing the first depth value by determining the first depth value corresponding to the direction from the light to the first point using the LTM, and comparing a distance between the light and the first point and the first depth value. The shader may be configured to compute a visibility with respect to one or more second points disposed in a direction identical to a direction from a viewpoint of a camera associated with rendering to the first point using the LTM. The shader may render a color value of the first point by performing a blending on a result of shading the first point and a result of shading the second point. An example of the blending may include, but is not limited to, an alpha-blending.

The light may be associated with an indirect light. For example, the light may include a virtual point light (VPL). The image processing apparatus may further include a sampler configured to sample the VPL on the 3D space based on the transparency of the object comprised in the 3D space. The sampler may be configured to sample the VPL in a lower density as the transparency of the object increases.

The foregoing and/or other aspects are achieved by providing an image processing apparatus, including a sampler configured to sample one or more VPLs based on a transparency of an object comprised in a 3D space, and a generator configured to generate an LTM corresponding to a first VPL from among the one or more VPLs, wherein the first LTM comprises depth information of the 3D space from a position of the first VPL. The sampler may be configured to sample the one or more VPLs in a lower density as the transparency of the object increases. The depth information may be probabilistically sampled based on the transparency of the object comprised in the 3D space.

The image processing apparatus may further include a shader configured to compute a visibility of the first VPL with respect to a first point using the first LTM. The shader may be configured to compute the visibility of the first VPL with respect to the first point by determining a first depth value corresponding to a direction from the first VPL to the first point using the first LTM, and comparing a distance between the first VPL and the first point and the first depth value. The generator may be configured to generate a second LTM corresponding to a second VPL differing from the first VPL from among the one or more VPLs, and the shader may be configured to compute a visibility of the second VPL with respect to the first point by determining a second depth value corresponding to a direction from the second VPL to the first point using the second LTM, and comparing a distance between the second VPL and the first point and the second depth value. The shader may be configured to compute a visibility with respect to one or more second points disposed in a direction identical to a direction from a viewpoint of a camera associated with rendering to the first point using the LTM, and perform an alpha-blending on a result of shading the first point and a result of shading the second points. The sampler may be configured to further sample one or more VPLs using a second LTM generated by the generator with respect to a direct light.

The foregoing and/or other aspects are achieved by providing an image processing method, including generating, by a generator, an LTM comprising depth information of a 3D space from a position of a light based on a transparency of an object, and computing, by a shader, a visibility of the light with respect to a first point using the LTM. The generating may include determining a first depth based on a transparency of one or more objects overlapping in a direction of a first position when the first depth corresponding to the first position on the LTM is determined. The generating may include performing a probability sampling on the first depth based on the transparency, wherein the first depth is sampled in a lower probability for an object having a higher transparency from among the one or more objects. The generating may include generating a first random number corresponding to the first position on the LTM, and determining, to be first depth information corresponding to the first position, a distance between the light and a first object having a transparency lower than the first random number from among the one or more objects overlapping in the direction of the first position. The computing may include computing the visibility of the light by determining a first depth value corresponding to the direction from the light to the first point using the LTM, and comparing a distance between the light and the first point and the first depth value.

The foregoing and/or other aspects are achieved by providing an image processing method, including sampling, by a sampler, one or more VPLs based on a transparency of an object comprised in a 3D space, and generating, by a generator, a first LTM including depth information of the 3D space from a position of a first VPL from among the one or more VPLs. The sampling may include sampling the one or more VPLs in a lower density as the transparency of the object increases. The depth information may be probabilistically sampled based on the transparency of the object.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
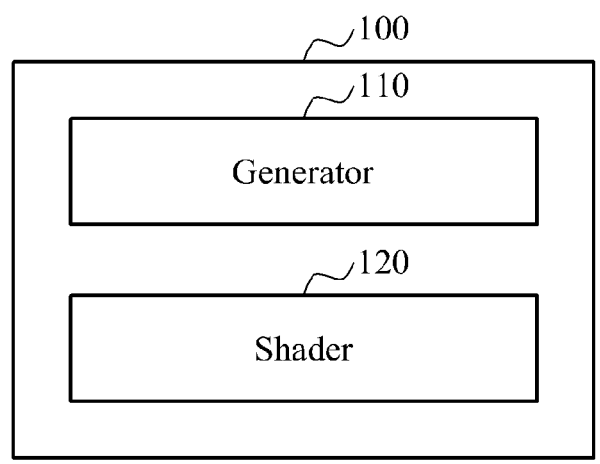
FIG. 1 illustrates an image processing apparatus according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

Although terms used herein are general and ordinary to those skilled in the art and defined to appropriately describe the example embodiments, there may be different terms depending on developments and/or changes of a technology, a custom, or the intent of an operator. Accordingly, the terms should not be construed as being limited to the example embodiments set forth herein; rather, these example embodiments are provided so that this disclosure will be thorough and complete, and will fully convey the concept of the disclosure to those skilled in the art.

FIG. 1 illustrates an image processing apparatus 100 according to example embodiments.

Referring to FIG. 1, the image processing apparatus 100 may include a generator 110 configured to generate a light transport map (LTM) corresponding to a light. Here, for example, the light may be a direct light and/or an indirect light. An example of the indirect light may include a virtual point light (VPL). The LTM may include depth information associated with viewing a three-dimensional (3D) space from a position or a viewpoint of the light. The LTM may also include 3D depth information from the position of the light in a similar manner to the depth map.

According to example embodiments, the depth information may be sampled based on a transparency of an object included in the 3D space. In this example, the sampling may include a probability sampling based on the transparency of the object. As an example, in the probability sampling, a depth may be sampled in a lower probability as the transparency of the object increases.

The generator 110 may generate a first random number corresponding to a first position on the LTM to determine a depth value corresponding to the first position. For example, the first random number may be a real number randomly provided as a value greater than zero and less than "1", however, the present disclosure is not limited thereto. The generator 110 may identify a first object, for example, an initially occurring object having a transparency lower than the first random number from among one or more objects overlapping in a direction towards the first position. As a result, a distance between the light and the first object may be determined to be the depth value of the first position.

The LTM generated by the generator 110 may further include transparency information and/or color information of an object in addition to the depth information, depending upon embodiments. Color information corresponding to the first position on the LTM may include information about color values of objects closer to the light than the first depth value in the direction of the first position. Transparency information corresponding to the first position may be a value obtained by multiplying transparency values of the objects closer to the light than the first depth value in the direction of the first position. Descriptions pertaining to the transparency information and/or color information further included by the LTM will be provided in greater detail with reference to FIGS. 3 and 4.

A shader 120 may compute, using the LTM, a visibility that determines whether a light associated with an LTM affects a color value of a first point to be rendered by the light. The shader 120 may determine the first depth value corresponding to the direction from the light to the first point using the LTM. The shader 120 may compute the visibility of the light by comparing a distance between the light and the first point and the first depth value. For example, when the first depth value is identical to the distance, the visibility may be computed to be "1", and when not identical, the visibility may be computed to be zero. Descriptions pertaining to the visibility computation will be provided in greater detail with reference to FIG. 6.

When the visibility is computed, the shader 120 may perform a blending on a color value of a plurality of points overlapping in the direction identical to the direction of the first point, and determine a first pixel value in the direction of the first point. Such a process may be understood as an example of a transparent/translucent layer representation by alpha-blending, and will be described in greater detail later.

Figure 2:
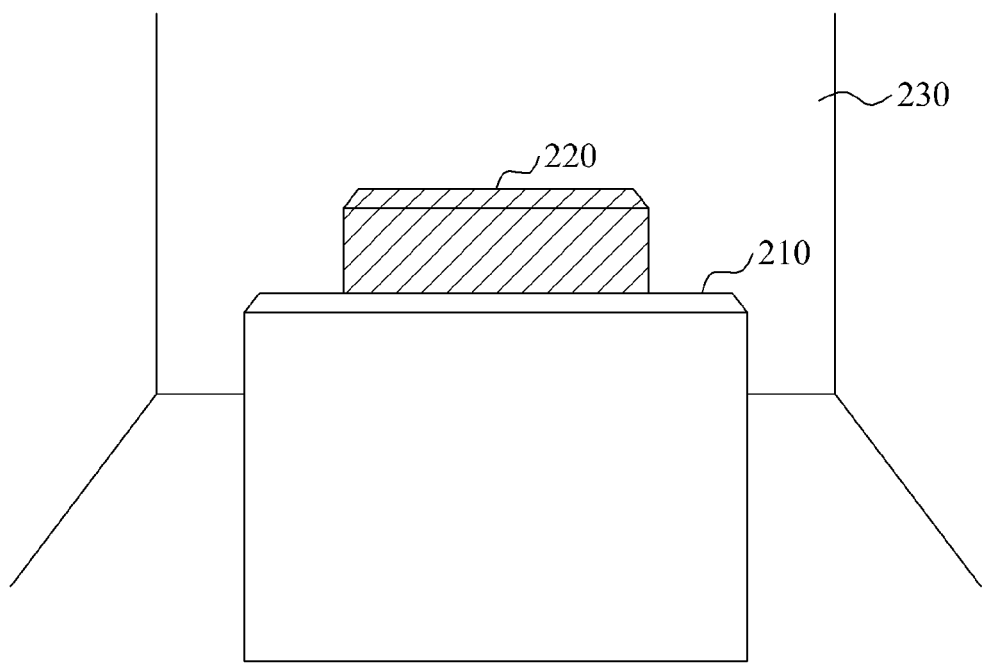
FIG. 2 is a perspective view illustrating an example of a three-dimensional (3D) model used in an operation of an image processing apparatus according to example embodiments.

FIG. 2 is a perspective view illustrating an example of a 3D model 200 used in an operation of an image processing apparatus according to example embodiments.

Referring to FIG. 2, an object 210 and an object 220 included in the 3D model 200 are disposed in a front of a background object 230. For example, the object 210 and the object 220 may be a transparent and/or translucent object. In general, computing a visibility to reflect shading effects by an indirect illumination is performed using a shadow map generated corresponding to the indirect illumination. However, in such a general visibility computing method, depth information included in the shadow map does not reflect or incorporate a transparency of an object. For example, using a transparent and/or translucent object is omitted in the generating of the shadow map. Alternatively, a method of determining a transparent and/or translucent object to be an opaque object is used in another related art. Accordingly, although overlapping effects amongst objects are represented by an alpha-blending method when a scene viewed from a viewpoint of a camera is rendered, effects of the transparent and/or translucent object are not represented in a shading by an indirect illumination.

According to example embodiments, transparencies of the objects 210 through 230 may be evaluated in a shading in which a result of a direct illumination and/or indirect illumination affecting color values of the objects 210 through 230 is reflected on a rendering result. Whether a light, for example, a direct light or an indirect light, affects a color value of a predetermined point of an object may be determined based on a presence of another object occluding a path between the predetermined point and the light. When the other object occludes the path between the predetermined point and the light, the visibility of the light may be computed to be zero, and the light may be determined not to affect the color value of the predetermined point. Conversely, when the other object does not occlude the path between the predetermined point and the light, the visibility of the light may be computed to be another value aside from "1" or zero, for example, and the light may be evaluated in the computing of the color value of the predetermined point.

The computing of the visibility may be performed using a pre-computed shadow map rather than performed in real time. For example, a shadow map viewing a 3D space from a viewpoint of a predetermined light may be generated in advance, and a visibility of the predetermined light with respect to a point to be rendered may be computed using the shadow map generated in advance. In this example, a depth of a direction from the predetermined light to the point may be determined using the shadow map, and a distance between the predetermined light and the point may be compared with the depth. When the distance between the predetermined light and the point is identical to the depth, the visibility may be determined to be zero. Although the shadow map is generated in advance to be used in such a process, a transparency of an object may not be evaluated during the process.

According to example embodiments, however, an LTM including depth information from a light to an object is generated based on a transparency of the object.

As previously described with reference to FIG. 1, the generator 110 may generate an LTM viewing a 3D model from a position of a light. The LTM may include a result of performing a probability sampling on depth information based on a transparency of an object in a manner that is different from a general shadow map.

For example, the LTM may reflect that a portion of photons emitted from a light passes through the object 210 and another portion does not pass through the object 210 when the object 210 is a transparent or translucent object. According to example embodiments, a random process based on the transparency of the object 210 may determine whether a light passing from a light in a first direction passes through the object 210 or is reflected. The random process may also determine whether the light passes through the object 220 overlapping behind the object 210 in the first direction or is reflected despite the light passing through the object 210. The determination based on the random process may refer to a probability sampling. Hereinafter, a probability sampling on depth information will be described in greater detail with reference to FIG. 3.

Figure 3:
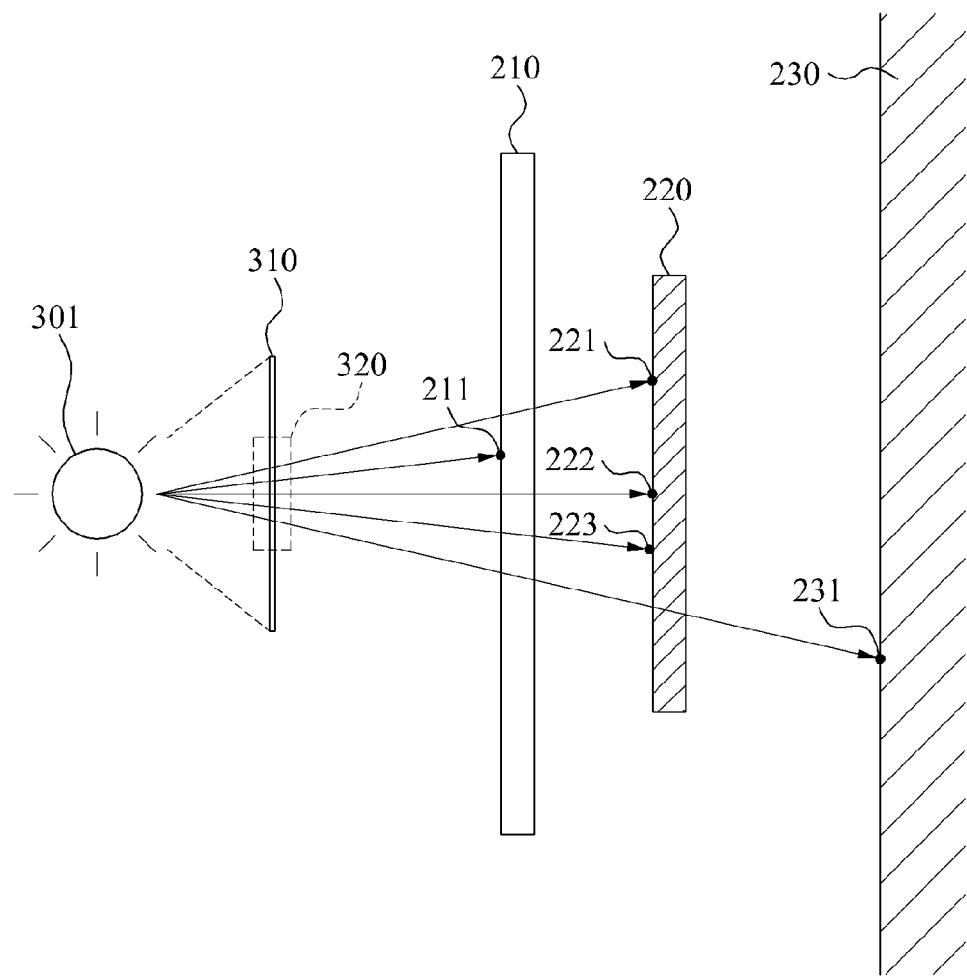
FIG. 3 is a plan view illustrating an example of sampling a virtual point light (VPL) in the 3D model of FIG. 2.

FIG. 3 is a plan view 300 illustrating an example of sampling a VPL in the 3D model 200 of FIG. 2.

Referring to the plan view 300, illustrated are points on the objects 210, 220, and 230 to which a light 301 disposed in the 3D model 200 is incident. A process of generating an LTM 310 from the light 301 may correspond to a process of generating a depth map viewing a 3D space from a viewpoint of the light 301. As shown in FIG. 3, the object 210 has a relatively high transparency, hence a relatively low translucency, the object 220 has a relatively low transparency, hence a relatively high translucency, and the object 230 is an opaque object. In a sampling of depth information included in the LTM 310, the LTM 310 may reflect a result in which the light 301 is reflected off of the object 210 in a relatively low probability, and the light 301 is reflected off of the object 220 in a relatively high probability. That is, for example, there may be a relatively low probability that light is reflected off of the object 210 and a relatively higher probability that light is reflected off of the object 220.

Descriptions pertaining to passing and reflection of rays 211, 221, 222, 223, and 231 that pass through a portion 320 of the LTM 310 are provided hereinafter. In an example, the ray 211 starting from the light 301 may be reflected off of the object 210. A depth value from the light 301 to the object 210 in a direction of the ray 211 may be determined to be a distance travelled by the ray 211 starting from the light 301 to the object 210 in the direction of the ray 211. The result above may be recorded in the LTM 310. The rays 221, 222, and 223 may pass through the object 210, and be reflected off of the object 220. This result may be reflected or incorporated in the LTM 310 as the depth information. In another example, the ray 231 may pass through all of the objects 210 and 220, and be reflected off of the object 230. In this example, a depth value in a direction of the ray 231 may be determined to be a distance from the light 301 to the object 230 in the direction of the ray 231.

During this process, the higher a transparency, the fewer the number of rays to be sampled. For example, when a normalized transparency of the object 210 is "0.8", the object 210 may be sampled so that 20% of rays are incident to the object 210. That is, for example, 20% of rays are reflected off of the surface of object 210 and 80% of rays pass through object 210. When a normalized transparency of the object 220 is "0.25", the object 220 may be sampled so that 75% of rays are incident to the object 220. That is, for example, 75% of rays are reflected off of the surface of object 220 and 25% of rays pass through object 220. When the object 230 is an opaque object having a zero transparency, the object 230 may be sampled so that no rays pass through the object 230 and all of the rays are incident to the object 230. In such a process in which a probability sampling is performed on reflection or passing of a ray based on a transparency of an object, a translucency of the objects 210 and 220 may be reflected or incorporated in the LTM 310. A depth value recorded in the LTM 310 will be described in greater detail with reference to FIG. 4.

Figure 4:
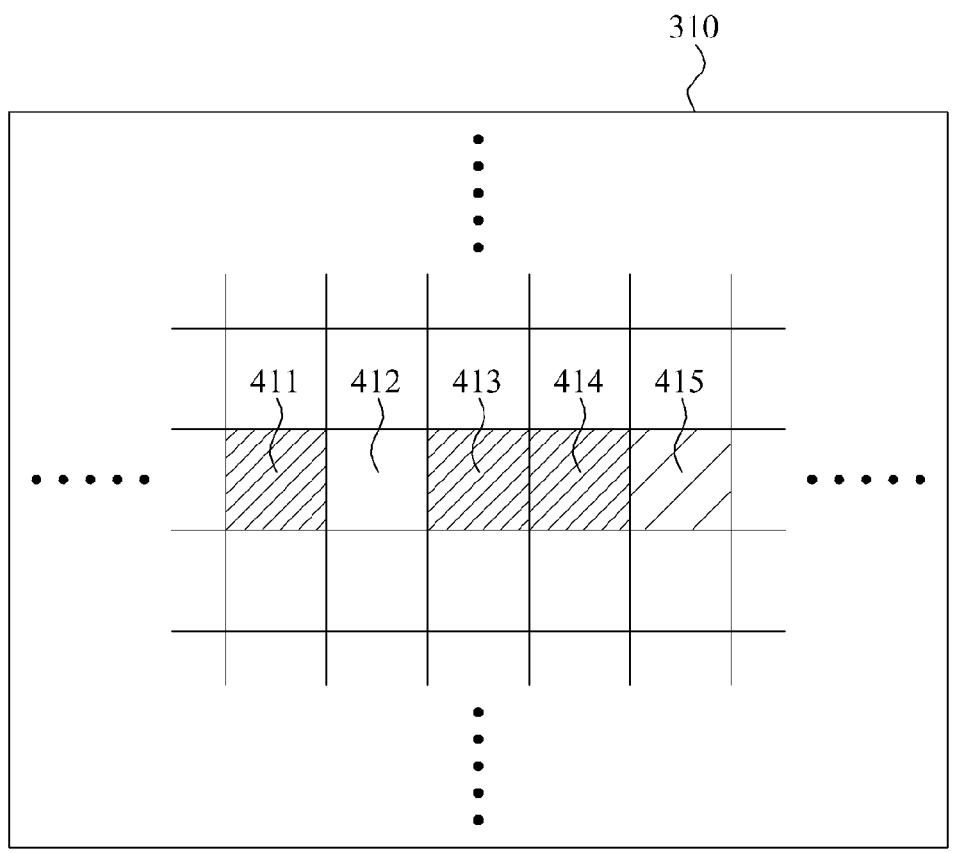
FIG. 4 illustrates a light transport map (LTM) according to example embodiments.

FIG. 4 illustrates the LTM 310 according to example embodiments.

Descriptions pertaining to the LTM 310 will be provided with reference to FIG. 3. As previously described in FIG. 3, when the normalized transparency of the object 210 is "0.8" and the normalized transparency of the object 220 is "0.25", a probability of a ray being incident to the object 210 is 20%, and a probability of a ray being incident to the object 220 is 60%, for example, calculated by 80%*75%. A probability of a ray reaching the opaque object 230 and being incident to the object 230 is 20%, for example, calculated by 80%*25%.

Based on such probability sampling, depths of positions, for example, pixels, included in the portion 320 of the LTM 310 may be determined. On the LTM 310, a depth in a direction of a first position 411 may correspond to a distance of the ray 221 starting from the light 301 to the object 220 to which the ray 221 is incident. A depth in a direction of a second position 412 may correspond to the distance of the ray 211 starting from the light 301 toward the object 210. In a similar manner, depths in directions of a third position 413 and a fourth position 414 may correspond to a distance of the rays 222 and 223, respectively, starting from the light 301 toward the object 220. A depth in a direction of a fifth position 415 may correspond to a distance of the ray 231 starting from the light 301 being incident to the object 230. Accordingly, as described above, the LTM 310 may include depth information associated with viewing a 3D model from a viewpoint, for example, a position, of the light 301.

According to example embodiments, in addition to depth information of overlapping objects at a plurality of depths, the LTM 310 may further include transparency information and color information of the objects at the plurality of depths. When a light passes through a transparent or translucent object, an intensity of the light may decrease based on a transparency of the object, and a color of the light may change by a color of the object. The LTM 310 may store such a change in the light.

As an example, transparency information, for example, "0.8", of the object 210 that the ray 221 passes through to reach the object 220 may be recorded at the position 411 along with color information of the object 210. The LTM 310 may reflect that the intensity of the light decreases to 80% and the color of the light changes by a color of the object 210 when the ray 221 passes through the object 210. Descriptions pertaining to the position 411 may be applied to the positions 413 and 414 (corresponding to rays 222 and 223, respectively), and thus, repeated descriptions will be omitted here for conciseness. As another example, "0.2" calculated by multiplying transparencies, for example, "0.8"*"0.25", of the objects 210 and 220, which the ray 231 passes through to reach the object 230 may be recorded at the position 415 along with color values of the objects 210 and 220. In an instance of the position 412, due to an absence of an object that the ray 211 passes through, transparency information of "1" and a color value of the light 301 may be recorded in the LTM 301.

The aforementioned recording of such information in the LTM is merely exemplary, and further additions or changes may be made to information to be recorded in the LTM. Also, the term "LTM" may not be construed as limiting the claimed scope, and various forms of embodiments may be possible. Hereinafter, descriptions pertaining to an LTM to be used in a shading and a color rendering of a light will be provided with reference to FIGS. 5 through 7.

Figure 5:
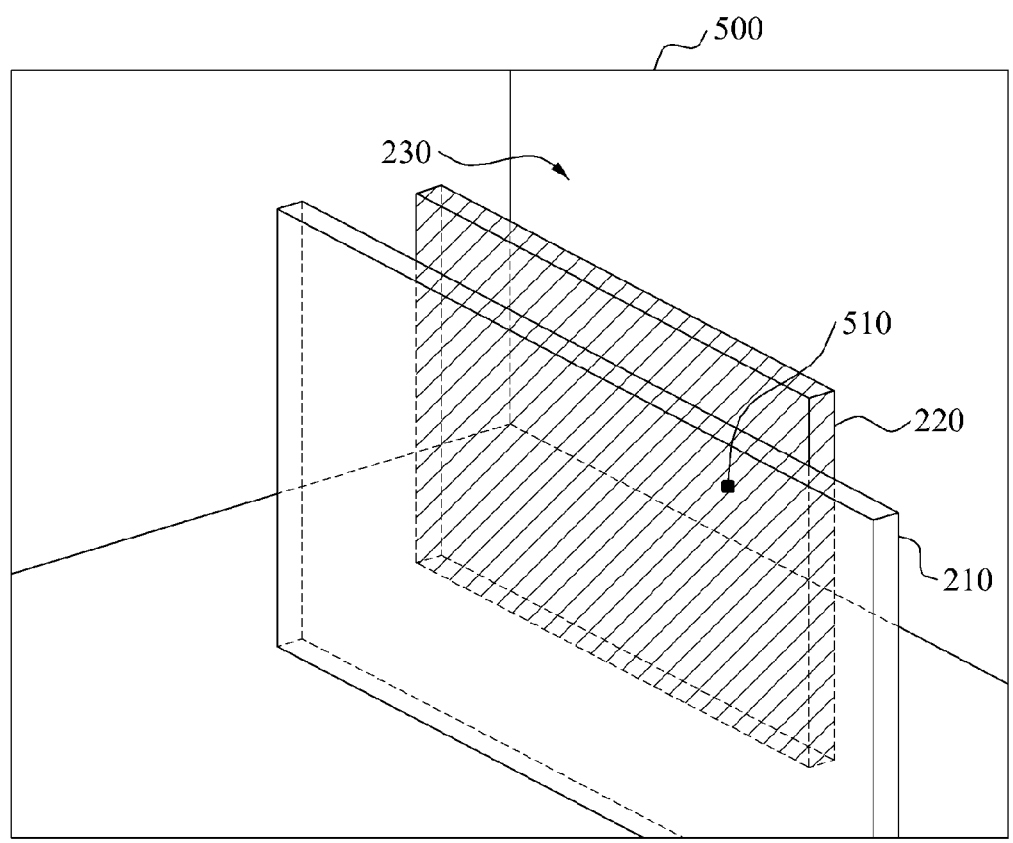
FIG. 5 illustrates a scene to be rendered from a viewpoint of a camera according to example embodiments.

FIG. 5 illustrates a scene 500 to be rendered from a viewpoint of a camera according to example embodiments.

The scene 500 may correspond to a view of a 3D model from a viewpoint of a camera to render an image. As an example, rendering a color value of a first pixel 510 in the scene 500 will be described. The objects 210, 220, and 230 are disposed to be overlapping in a direction of the first pixel 510 to be rendered.

In this example, whether a predetermined light, for example, a direct light or an indirect light, affects the overlapping objects may be determined using an LTM corresponding to each light. Hereinafter, a process of rendering the color value of the first pixel 510 will be described with reference to FIG. 6.

Figure 6:
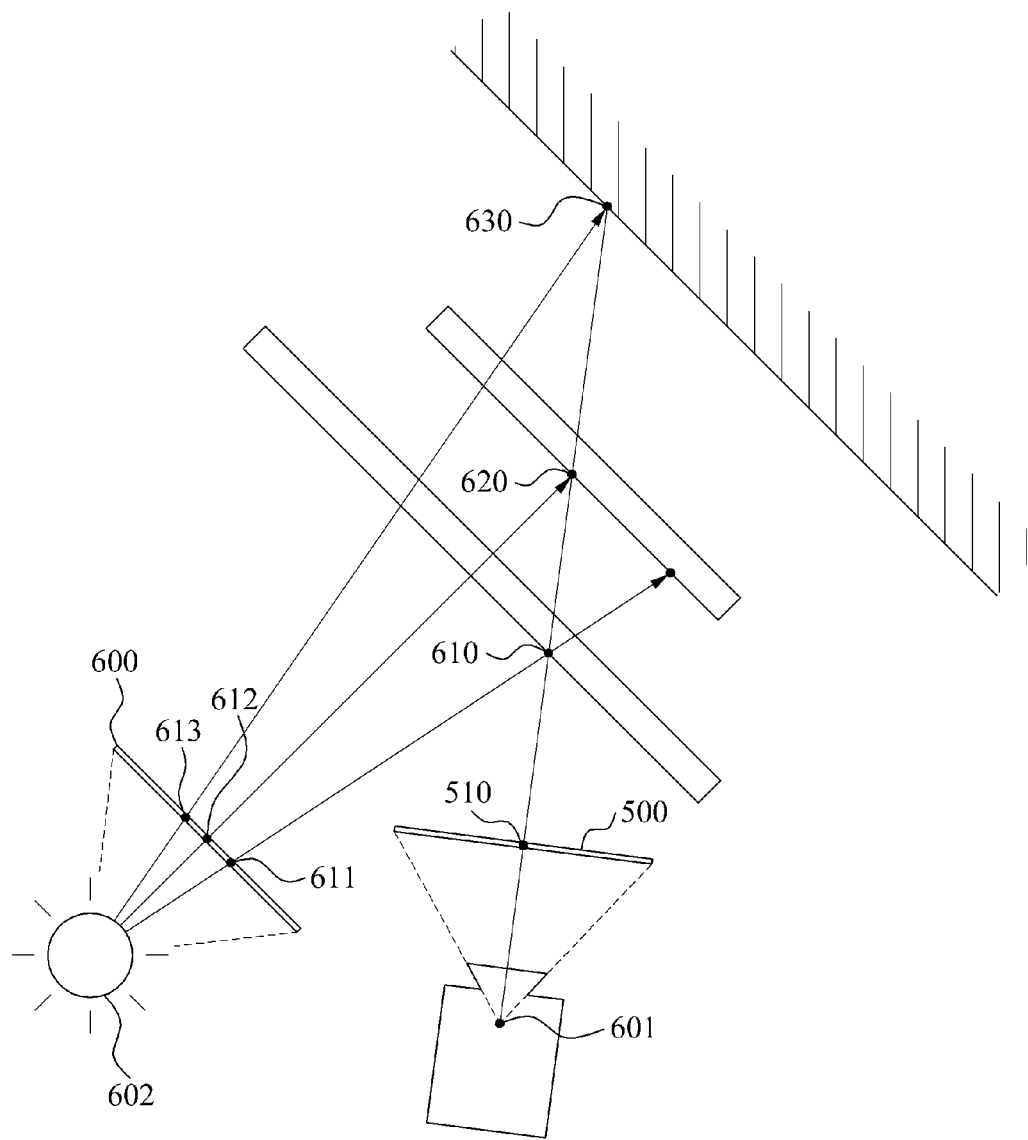
FIG. 6 illustrates a process of computing a color value of a first point according to example embodiments.

FIG. 6 illustrates a process of computing a color value of a first point according to example embodiments.

Points 610, 620, and 630 on an object overlap in the direction of the first pixel 510 of the scene 500 from a viewpoint of a camera 601. By way of example, a brightness of a light 602 including color information is L1, material color values of the points 610, 620, and 630 are G1, G2, and G3, respectively, and reflectivities of the points 610, 620, and 630 are R1, R2, and R3, respectively. Visibilities of the light 602 with respect to the points 610, 620, and 630 are V1, V2, and V3, respectively. A transparency of an object including the point 610 is T1, and a transparency of an object including the point 620 is T2. Effects of color values C1, C2, and C3 of the points 610, 620, and 630 by the light 602 are represented in Equations 1 through 3, respectively.

$$C1 = L1*V1*R1*G1 \qquad \text{[Equation 1]}$$

$$C2 = L1*V2*T1*R2*G2 \qquad \text{[Equation 2]}$$

$$C3 = L1*V3*T1*T2*R3*G3 \qquad \text{[Equation 3]}$$

Referring to Equation 1, the color value C1 of the first point 610 by the light 602 is obtained. As shown in FIG. 6, the visibility V1 indicating whether the light 602 is visible from the first point 610, for example, whether a ray starting from the light 602 is reflected off of the first point 610 or passes through the first points 610, may be computed using an LTM 600 corresponding to the light 602. On the LTM 600, the visibility V1 may be computed by comparing a depth value recorded at a position 611 in a direction of the first point 610 and a distance between the light 602 and the first point 610. When the depth value differs from the distance, the ray starting from the light 602 may be determined not to be reflected off of the first point 610. As shown in FIG. 6, the ray starting from the light 602 passes through the first point 610 instead of being reflected off of the first point 610, and thus, the visibility is zero, i.e., V1=0. Accordingly, since V1=0, C1=0 is obtained in Equation 1.

Referring to Equation 2, the color value C2 of the second point 620 by the light 602 is obtained. As shown in FIG. 6, the ray starting from the light 602 is reflected off of the second point 620. On the LTM 600, a depth value recorded at a position 612 in a direction of the second point 620 is identical to a distance between the light 602 and the second point 620. As a result, the visibility of the light 602 with respect to the second point 620 is given by V2=1. Accordingly, C2=L1*T1*R2*G2 is obtained in Equation 2.

Referring to Equation 3, the color value C3 of the third point 630 by the light 602 is obtained. As shown in FIG. 6, the ray starting from the light 602 is reflected off of the third point 630. On the LTM 600, a depth value recorded at a position 613 in a direction of the third point 630 is identical to a distance between the light 602 and the third point 630. As a result, the visibility of the light 602 with respect to the third point 630 is given by V3=1. Accordingly, C3=L1*T1*T2*R3*G3 is obtained in Equation 3.

When C1, C2, and C3 are obtained, the color value C of the first pixel 510 by the light 602 may be obtained based on a method, for example, a method of performing an alpha-blending on the color values C1, C2, and C3 of overlapping three layers, however, the present disclosure is not limited thereto. The alpha-blending method is a general method of rendering transparent layers, and an exemplary computation based on the alpha-blending method may be expressed by Equation 4.

$$\begin{aligned} C &= C1 + T1*C2 + T1*T2*C3 \quad \text{[Equation 4]}\\ &= 0 + T1*(L1*T1*R2*G2) + \\ &\quad T1*T2*(L1*T1*T2*R3*G3)\\ &= L1*T1^2(R2*G2 + T2^2*R3*G3) \end{aligned}$$

The color value C of the first pixel 510 by the light 602 is obtained based on Equation 4. For example, the light 602 may be a plurality of direct lights or indirect lights that generates a color value in a 3D model. Accordingly, when color values of the first pixel 510 by a plurality of other lights aside from the light 602 are obtained and a sum of the color values is calculated, an ultimate color value of the first pixel 510 may be determined. Hereinafter, overlapping of color values by a plurality of lights will be described with reference to FIG. 7.

Figure 7:
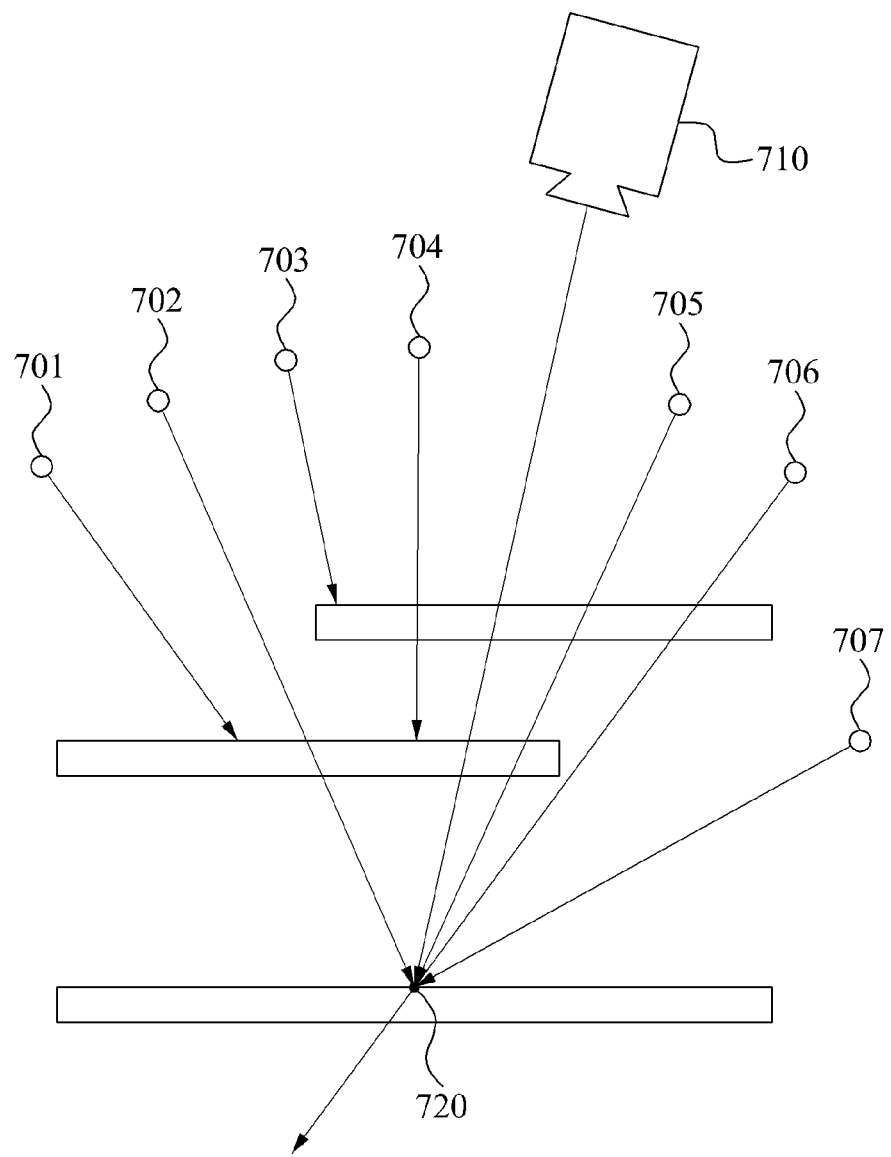
FIG. 7 illustrates a rendering process according to example embodiments.

FIG. 7 illustrates a rendering process according to example embodiments.

Descriptions pertaining to obtaining a color value of a predetermined point 720 from a viewpoint of a camera 710 will be provided. Referring to FIG. 7, a visibility for each of lights 701 through 707 with respect to the point 720 may be zero or "1". The visibility may be computed based on a depth in a direction of the point 720 on an LTM for each of the lights 701 through 707.

As shown in FIG. 7, the visibilities of the lights 701, 703, and 704 with respect to the point 720 may be zero. The visibilities of the lights 702, 705, and 706 with respect to the point 720 may be "1". Color values of the point 720 affected by the lights 702, 705, and 706, respectively, having "1" visibility may be computed based on the method previously described with reference to FIGS. 1 through 4, and a sum of the color values may be determined to be the color value of the point 720.

Through this, effects of a transparent and/or translucent object may be realistically reflected in representation of indirect light effects for global illumination rendering. In the preceding descriptions, examples in which a transparent and/or translucent object is evaluated in an indirect light rendering by generating LTMs with respect to a direct light and/or an indirect light, computing a visibility with respect to a point, and shading a color value are provided.

According to example embodiments, a transparency of an object may be evaluated in a VPL sampling by a direct light or an indirect light. Hereinafter, examples in which a transparency of an object is reflected in a VPL sampling will be described.

Figure 8:
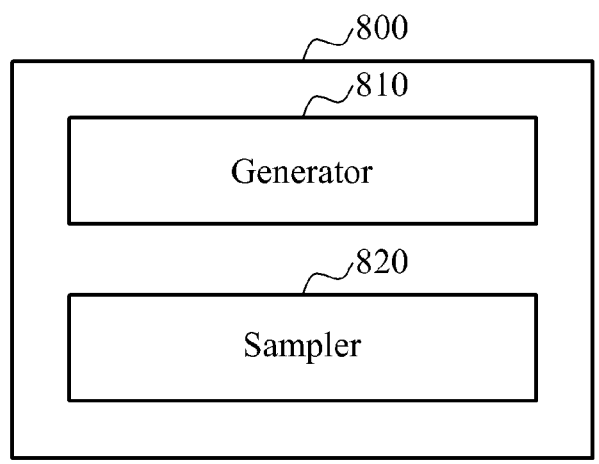
FIG. 8 illustrates an image processing apparatus according to example embodiments.

FIG. 8 illustrates an image processing apparatus 800 according to example embodiments.

The image processing apparatus 800 may perform at least one VPL sampling in a 3D model. In a non-limiting example, a sampler 820 of the image processing apparatus 800 may dispose a VPL that represents natural phenomena, such as reflection or diffraction of a light, on the 3D model or in a 3D space, hereinafter also referred to as "sampling a VPL" in order to reflect global illumination effects based on a radiosity method in rendering. According to example embodiments, the sampler 820 may perform a sampling based on a transparency of an object along with or instead of a sampling using a general importance-based VPL sampling. In this example, the higher the transparency of the object, the fewer a number of VPLs to be sampled, and the lower the transparency of the object, the greater the number of VPLs to be sampled. In such a process, other properties, for example, a material of the object may also be evaluated in addition to the transparency of the object. By way of example, material information indicating whether a surface of the object is specular or diffusive, or color information may be evaluated.

The generator 810 may generate an LTM with respect to a direct light or each of differing VPLs sampled in advance as previously described with reference to FIGS. 1 through 4. In one example, the sampler 820 may sample the VPLs using a transparency of objects absent the LTM generated by the generator 810.

However, in another example, the sampler 820 may further sample the VPLs using the LTM generated by the generator 810. Based on the LTM generated by the generator 810, a point on the object at which another light is reflected off of may be determined, and when a random sampling is performed in the LTM, a greater number of VPLs may be sampled at a point at which the transparency of the object is relatively low. Moreover, color information and transparency information may be evaluated in the additional VPL sampling because the LTM includes the color information and the transparency information. For example, during a process of determining whether to perform the additional VPL sampling on a point corresponding to a predetermined position on the LTM, the VPLs may not be sampled further when a transparency at the predetermined position is determined to be lower than a predetermined value at the predetermined position.

In general, the greater the number of VPLs to be sampled, the higher a quality of rendering. However, the number of VPLs to be sampled needs to be adjusted appropriately because a rendering speed may be reduced by a significant increase in an amount of computation. In this process, a rendering that optimizes the amount of computation and enables a superior sense of reality may be achieved by evaluating the transparency of the object.

Figure 9:
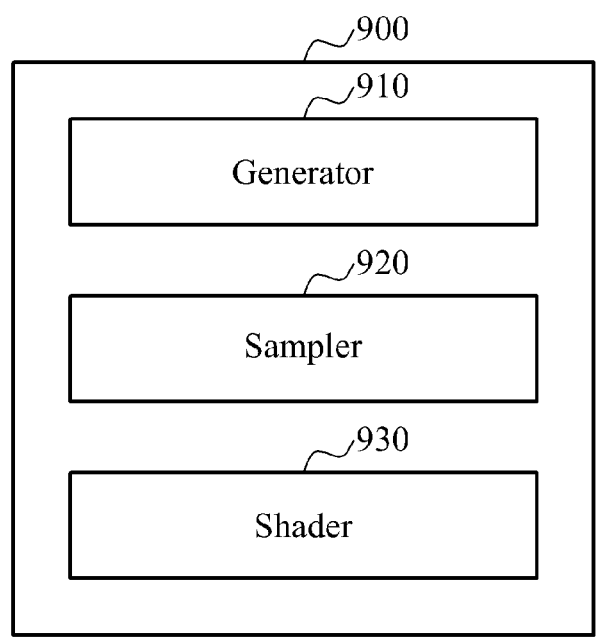
FIG. 9 illustrates an image processing apparatus according to example embodiments.

FIG. 9 illustrates an image processing apparatus 900 according to example embodiments.

According to example embodiments, the image processing apparatus 900 includes a generator 910 configured to generate an LTM, a sampler 910 configured to sample a VPL, and a shader 930 configured to perform a global illumination rendering using an LTM.

The generator 910 may generate an LTM. Here, a light may be a direct light or an indirect light, for example, a VPL. As previously described with reference to FIG. 1, the LTM may include at least one of depth information, transparency information, and color information. Determining a depth at a predetermined position on the LTM may be performed by a probability sampling in which a transparency of an object corresponding to the predetermined position is evaluated. For example, the probability sampling may refer to a sampling performed on a depth in a relatively low probability as the transparency of the object increases. This process may be applied to descriptions provided with reference to FIG. 1, and will be described in greater detail with reference to FIG. 10.

The sampler 920 may sample at least one VPL based on a transparency of an object in a 3D model. As described above, the sampler 920 may perform a sampling based on the transparency of the object along with or in lieu of a general importance-based VPL sampling. According to example embodiments, the higher the transparency of the object, the fewer the number of VPLs to be sampled, and the lower the transparency of the object, the greater the number of VPLs to be sampled. In such a process, other properties, for example, a material of the object may also be evaluated in addition to the transparency of the object.

The sampler 920 may further sample the VPL using the LTM generated by the generator 910 with respect to a direct light. As previously described with reference to FIG. 8, when the VPL is sampled at a predetermined position on the generated LTM, the VPL may be sampled based on the transparency of the object because the LTM reflects the transparency of the object. When the VPL sampling is performed, the shader 930 may compute a color value by illumination effects of a plurality of lights using the LTM.

For example, the shader 930 may compute a visibility indicating whether a light associated with the LTM affects a color value of a first point to be rendered using the generated LTM. Descriptions described with reference to FIGS. 1 through 6 may be applied to this process and thus, repeated descriptions will be omitted here for conciseness. When a color value by a plurality of direct and/or indirect lights is obtained, a blending may be performed on the color value, and the color value may be rendered to be a final color value as previously described with reference to FIG. 7. As described above, an example of such a blending may be an alpha-blending, however, the present disclosure is not limited thereto.

Figure 10:
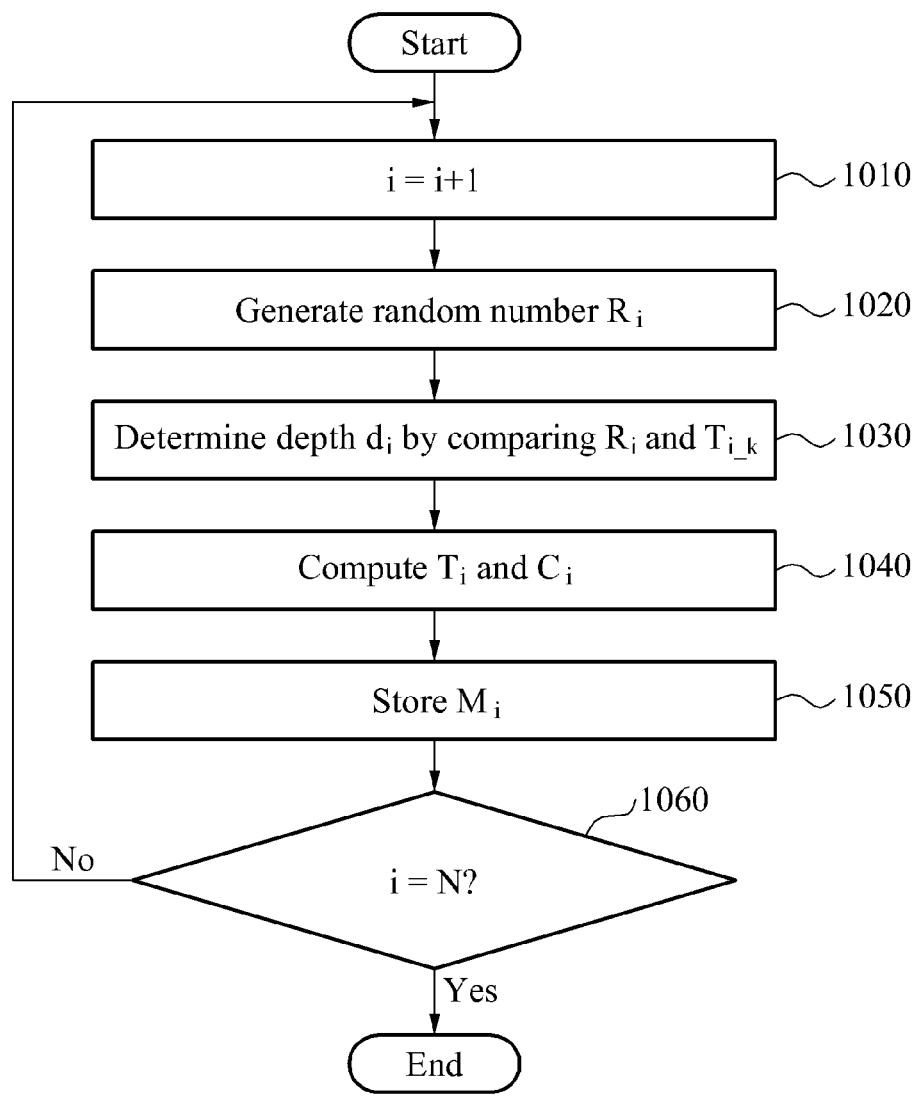
FIG. 10 is a flowchart illustrating a process of generating an LTM in an image processing method according to example embodiments.

FIG. 10 illustrates a process of generating an LTM in an image processing method according to example embodiments.

Hereinafter, an example of a process in which an LTM of a first light, also referred to as a first LTM, is generated with respect to the first light will be described. A process of sampling depth information with respect to an N number of positions on the first LTM is illustrated with reference to FIG. 10. In operation 1010, "i" which is set to be an initial value of zero may increase by "1", for example, calculated by "i=i+1". In operation 1020, a random number $R_i$ of an "i"-th iteration may be generated. $R_i$ may be a real number normalized to a value greater than zero and less than "1". When an "i"-th position on the first LTM is viewed from a viewpoint of the first light, a plurality of overlapping object layers may exist. A transparency for each of the overlapping layers may be a real number normalized to a value greater than zero and less than "1".

In operation 1030, $R_i$ may be compared with $T_{i\_k}$ in a sequence of being closer to a light source. $T_{i\_k}$ denotes a transparency of a k-th object layer from among the plurality of overlapping object layers. When an initially occurring $T_{i\_k}$ less than $R_i$ is obtained, a distance from the first light to a k-th object may be a depth value $d_i$ at the i-th position. In operation 1040, $T_i$ may be obtained by multiplying transparencies of objects between the k-th object and the first light, and information $C_i$ about color values of the objects may be obtained. Descriptions provided in the preceding with reference to FIG. 4 may be applied to this process, and thus, repeated descriptions will be omitted here for conciseness.

In operation 1050, a value determined by $d_i$, $T_i$, and $C_i$ may be stored as a map value $M_i$ at the i-th position of the first LTM. In operation 1060, the above process may be iteratively performed until reaching an N-th position of the first LTM, and the first LTM may be generated.

When an LTM is generated with respect to a direct light and an indirect light through such a process, a visibility may be computed with respect to a first pixel to be rendered at a viewpoint of a camera. Hereinafter, descriptions pertaining to the computing of the visibility will be provided with reference to FIG. 11.

Figure 11:
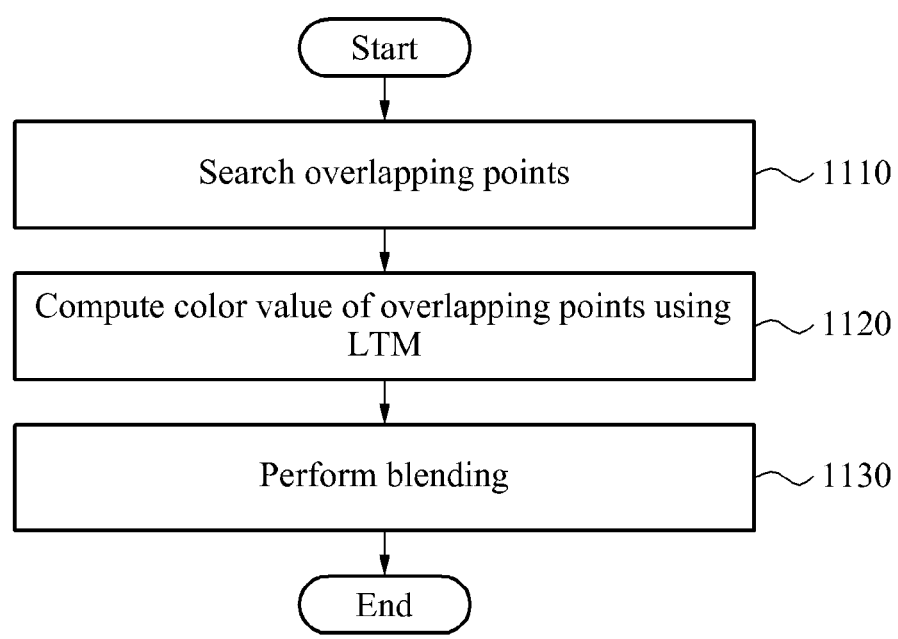
FIG. 11 is a flowchart illustrating a process of performing a color shading in an image processing method according to example embodiments.

FIG. 11 illustrates a process of performing a color shading in an image processing method according to example embodiments.

As previously described with reference to FIG. 6, a color of a transparent/translucent object may be evaluated during a process of computing a color value with respect to a first pixel in a scene to be rendered. In operation 1110, a plurality of points overlapping in a direction of the first pixel may be searched. For example, the first point 610, the second point 620, and the third point 630 may be searched as shown in FIG. 6.

In operation 1120, a visibility with respect to a predetermined light, for example, a direct light or an indirect light, may be computed. A visibility of a first light with respect to the first point 610 may be computed by comparing a depth value in a direction of the first point and a distance between the first light and the first point 610. When the depth value is identical to the distance, the visibility may be computed to be "1", and when not identical, the visibility may be computed to be zero. However, since the above computation is merely exemplary and may not be construed as limiting the claimed scope, since various forms of embodiments may be possible. When the visibility is computed, a color value generated by the first light may be computed as previously described with reference to FIGS. 1 through 3.

In operation 1130, the color value of the first light with respect to the first pixel may be determined by performing a blending, for example, an alpha-blending, on color values of the first point 610 through the third point 630. When the above process is performed on other lights, for example, a direct light and an indirect light, a value of the first pixel may be determined. Descriptions provided in the preceding with reference to FIG. 7 may be applied to this process, and thus, repeated descriptions will be omitted here for conciseness.

Figure 12:
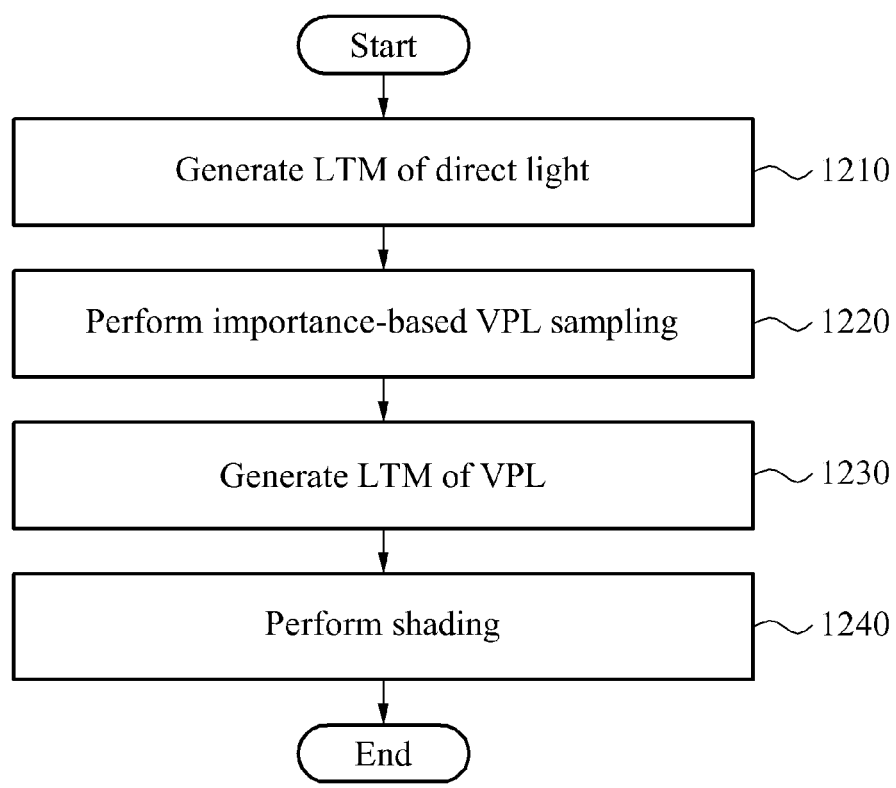
FIG. 12 is a flowchart illustrating a process of sampling a VPL in an image processing method according to example embodiments.

FIG. 12 illustrates a process of sampling a VPL in an image processing method according to example embodiments.

In operation 1210, a generator of an image processing apparatus may generate an LTM of a direct light. As previously described with reference to FIG. 8, the LTM with respect to the direct light may be generated to be used in a sampling process, however, a VPL sampling may also be possible without generating the LTM with respect to the direct light.

In operation 1220, an importance-based VPL sampling may be performed. In this example, the importance-based VPL sampling may be performed based on a transparency/reflectivity, a material property, a color, a mobility of an object on which the VPL sampling is to be performed. According to example embodiments, the VPL sampling may be performed based on the transparency of the object. For example, the higher the transparency of the object, the fewer the number of VPLs to be sampled, and the lower the transparency of the object, the greater the number of VPLs to be sampled. Descriptions provided in the preceding with reference to FIG. 8 and further may be applied to this process, and thus, repeated descriptions will be omitted here for conciseness.

When the VPL sampling is performed, an LTM may be generated with respect to a corresponding VPL in operation 1230. When LTMs are generated with respect to the direct light and an indirect light, a shading may be performed in operation 1240. Descriptions provided in the preceding with reference to FIGS. 5 through 7 and FIG. 11 may be applied to this process, and thus, repeated descriptions will be omitted here for conciseness.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An image processing apparatus, comprising:
a processor configured to
   generate a light transport map (LTM) corresponding to a light, wherein the LTM comprises a first position representing a first point on a first object in a three-dimensional (3D) space;
   determine, for the first position, a distance value indicating a first distance in a direction between the light and the first point;
   determine, for the first position, depth information indicating a second distance in the direction between the light and a point on an object in the 3D space that reflects the light, wherein the depth information is sampled using a probability sampling based on a transparency of the object;
   compare the distance value and the depth information for the first position of the LTM to generate a comparison result; and
   compute a visibility of the first point at the first position using the LTM and the comparison result,
wherein the processor is further configured to determine the depth information based on a corresponding transparency of one or more objects overlapping in the direction of the light, and wherein the corresponding transparency of each object of the one or more objects determines whether the corresponding each object of the one or more objects reflects the light.

2. The image processing apparatus of claim 1, wherein in the probability sampling, the sampling comprises a sampling of the depth information in a lower probability as the transparency of the object increases.

3. The image processing apparatus of claim 1, wherein in the probability sampling, a relationship between a number of rays sampled and the transparency of the object is such that the higher the transparency, the fewer the number of rays to be sampled.

4. The image processing apparatus of claim 1, wherein the processor is further configured to generate a first random number corresponding to the first position on the LTM, and determine, as the depth information corresponding to the first position, the second distance to be a distance between the light and an object having a transparency lower than the first random number from among the one or more objects overlapping in the direction from the light towards the object.

5. The image processing apparatus of claim 1, wherein, in addition to the depth information, the LTM further comprises color information and transparency information of the object corresponding to the depth information.

6. The image processing apparatus of claim 5, wherein first color information corresponding to the first position comprises color information of one or more objects overlapping in the direction from the light to the point on the object and of which a distance from the light is less than a first depth value of the depth information.

7. The image processing apparatus of claim 5, wherein first transparency information corresponding to the first position is a value obtained by multiplying transparency values of each of one or more objects overlapping in the direction from the light to the point on the object and of which a distance from the light is less than a first depth value of the depth information.

8. The image processing apparatus of claim 1, wherein the processor is configured to
upon the comparison result indicating that the distance value and the depth information are equal, compute the visibility to be "1"; and
upon the comparison result indicating that the distance value and the depth information are not equal, compute the visibility to be "0".

9. The image processing apparatus of claim 8, wherein the visibility determines whether or not the light associated with the LTM affects a color value of the first point.

10. The image processing apparatus of claim 1, wherein the processor is further configured to
compute a second visibility with respect to a second point disposed in a direction identical to a direction from a viewpoint of a camera associated with rendering the first point using the LTM, and
perform an alpha-blending on a result of a shading of the first point and a result of a shading of the second point.

11. The image processing apparatus of claim 1, wherein the light comprises a virtual point light (VPL).

12. The image processing apparatus of claim 11, wherein the processor is further configured to sample the VPL on the 3D space based on the transparency of the object comprised in the 3D space.

13. The image processing apparatus of claim 12, wherein the processor is configured to sample the VPL at a lower density as the transparency of the object increases.

14. The image processing apparatus of claim 1, wherein the processor is further configured to compute a color effect to be applied to the first point during rendering by multiplying a color of the first point by the visibility.

15. The image processing apparatus of claim 1, wherein the processor is further configured to compute an intensity of a light ray reflected at the first point by multiplying transparencies of overlapping objects positioned closer to the light in the 3D space than the first object.

16. An image processing apparatus, comprising:
a processor configured to
sample a virtual point light (VPL) using a probability sampling based on a transparency of an object comprised in a three-dimensional (3D) space;
generate a light transport map (LTM) corresponding to the VPL, wherein the LTM comprises a first position representing a first point on a first object in the 3D space;
determine, for the first position, a distance value indicating a first distance in a direction between the VPL and the first point;
determine, for the first position, depth information indicating a second distance in the direction between the VPL and a point on the object in the 3D space, wherein the object reflects the VPL; and
store the depth information at the first position in the LTM,
wherein the processor is further configured to determine the depth information based on a corresponding transparency of one or more objects overlapping in the direction of the VPL, and wherein the corresponding transparency of each object of the one or more objects determines whether the corresponding each object of the one or more objects reflects the VPL.

17. The image processing apparatus of claim 16, wherein the depth information is sampled in a lower density as a transparency of the object increases.

18. The image processing apparatus of claim 16, wherein the processor is further configured to compute a visibility of the first point at the first position using the LTM.

19. The image processing apparatus of claim 18, wherein the processor is configured to compute the visibility based on a comparison result, the comparison result obtained by comparing the distance value and the depth information for the first position of the LTM.

20. The image processing apparatus of claim 18, wherein the processor is further configured to
generate a second LTM corresponding to a second VPL, wherein the second LTM comprises a second position, the second position representing the first point on the first object;
compare a second distance value, indicating a second distance between the second VPL and the first point, with second depth information, indicating a traversal distance between the second VPL and a point on an object in the 3D space which reflects the second VPL, to generate a second comparison result; and
compute a second visibility of the first point at the second position based on the second LTM and the second comparison result.

21. The image processing apparatus of claim 18, wherein the processor is further configured to
compute a second visibility with respect to a second point disposed in a direction identical to a direction from a viewpoint of a camera associated with rendering the first point using the LTM, and
perform an alpha-blending on a result of a shading of the first point and a result of a shading of the second point.

22. The image processing apparatus of claim 16, wherein the processor is configured to further sample a second VPL using a second LTM generated with respect to a direct light.

23. An image processing method, comprising:
   generating, by a processor, a light transport map (LTM) corresponding to a light, wherein the LTM comprises a first position representing a first point on a first object in a three-dimensional (3D) space;
   determining, by the processor and for the first position, a distance value indicating a first distance in a direction between the light and the first point;
   determining, by the processor and for the first position, depth information indicating a second distance in the direction between the light and a point on an object in the 3D space that reflects the light, wherein the depth information is sampled using a probability sampling based on a transparency of the object,
   wherein the determining of the depth information comprises determining the depth information based on a corresponding transparency of one or more objects overlapping in the direction of the light, and wherein the corresponding transparency of each object of the one or more objects determines whether the corresponding each object of the one or more objects reflects the light;
   comparing, by the processor, the distance value and the depth information for the first position of the LTM to generate a comparison result; and
   computing, by the processor, a visibility of the first point at the first position using the LTM and the comparison result.

24. The image processing method of claim 23, wherein the depth information is sampled at a lower probability as the transparency of the object increases.

25. The image processing method of claim 23, further comprising:
   generating a first random number corresponding to the first position on the LTM, and
   determining, as the depth information corresponding to the first position, the second distance to be a distance between the light and an object having a transparency lower than the first random number from among the one or more objects overlapping in the direction of the object.

26. The image processing method of claim 23, wherein the computing comprises:
   upon the comparison result indicating that the distance value and the depth information are equal, computing the visibility to be "1"; and
   upon the comparison result indicating that the distance value and the depth information are not equal, computing the visibility to be "0".

27. A non-transitory computer-readable medium comprising a program for instructing a computer to perform the method of claim 23.

28. An image processing method, comprising:
   sampling, by a processor, a virtual point light (VPL) using a probability sampling based on a transparency of an object comprised in a three-dimensional (3D) space;
   generating, by the processor, a light transport map (LTM), wherein the LTM comprises a first position representing a first point on a first object in the 3D space;
   determining, by the processor and for the first position, a distance value indicating a first distance in a direction between the VPL and the first point;
   determining, by the processor and for the first position, depth information, indicating a second distance in the direction between the VPL and a point on the object in the 3D space, wherein the object reflects the VPL; and
   storing, by the processor, the depth information at the first position in the LTM,
   wherein the determining of the depth information comprises determining the depth information based on a corresponding transparency of one or more objects overlapping in the direction of the VPL, and wherein the corresponding transparency of each object of the one or more objects determines whether the corresponding each object of the one or more objects reflects the VPL.

29. The image processing method of claim 28, wherein the depth information is sampled at a lower density as a transparency of the object increases.

* * * * *